US006603626B1

(12) United States Patent  (10) Patent No.: US 6,603,626 B1
Takayama  (45) Date of Patent: Aug. 5, 2003

(54) TAPE DRIVING APPARATUS AND RECORDING MEDIUM

(75) Inventor: Yoshihisa Takayama, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/465,266

(22) Filed: Dec. 17, 1999

(30) Foreign Application Priority Data

Dec. 18, 1998  (JP) .......................................... 10-360793

(51) Int. Cl.$^7$ ................................................ G11B 15/46
(52) U.S. Cl. .................................................. 360/73.04
(58) Field of Search .......................... 360/73.04, 72.2, 360/73.08, 69

(56) References Cited

U.S. PATENT DOCUMENTS

| | | | | |
|---|---|---|---|---|
| 4,411,008 A | * | 10/1983 | d'Alayer de Costemore d'Arc et al. | ................................. 377/18 |
| 5,210,661 A | * | 5/1993 | Woo | .............................. 360/71 |
| 5,852,534 A | * | 12/1998 | Ozue et al. | .................... 360/69 |
| 5,892,633 A | * | 4/1999 | Ayres et al. | ............. 360/73.08 |
| 6,307,700 B1 | * | 10/2001 | Takayama | .................. 360/72.2 |

* cited by examiner

*Primary Examiner*—David Hudspeth
*Assistant Examiner*—Mitchell Slavitt
(74) *Attorney, Agent, or Firm*—Jay H. Maioli

(57) ABSTRACT

A tape driving apparatus and a recording medium, capable of detecting a target running amount during High Speed Search. Wherein upon a search command, a system controller sets a target position based on a specified position specified by this search command. Then, the system controller calculates the target running amount from the current position to the target position based on a spanned distance and calculates the target count value as the running amount corresponding to the calculated distance. Then, the system controller runs the magnetic tape while counting the reel FG pulses and shifts to High Speed Search. Starting High Speed Search, the system controller judges whether or not the count value of the reel FG pulses has reached the target count value. When it judges that the count value has not reached the target count value, it considers that the target position has not been reached yet and continues High Speed Search. When, it judges that the count value has reached the target count value, it shifts to Normal Search. After shifting to Normal Search, it judges whether the specified position has been reached or not based on information read out of the magnetic tape and when it judges that the specified position has not being reached yet, it continues Normal Search. When it judges that the specified position has been reached, it ends the search.

3 Claims, 20 Drawing Sheets

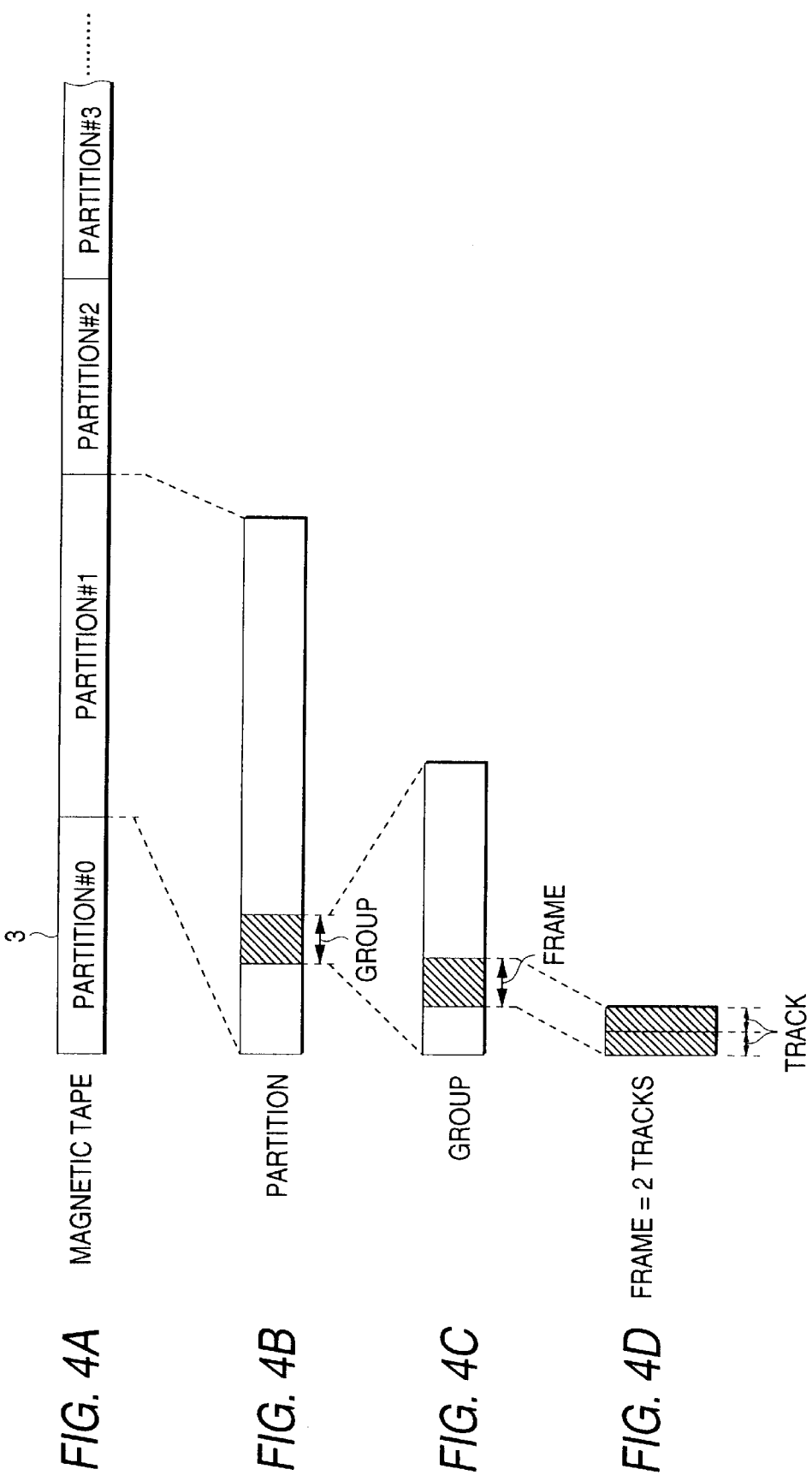

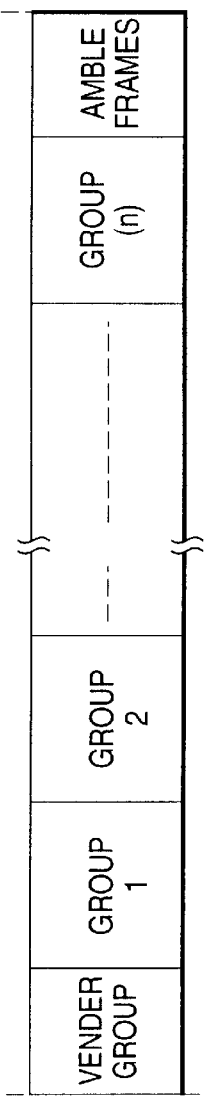
FIG. 6A
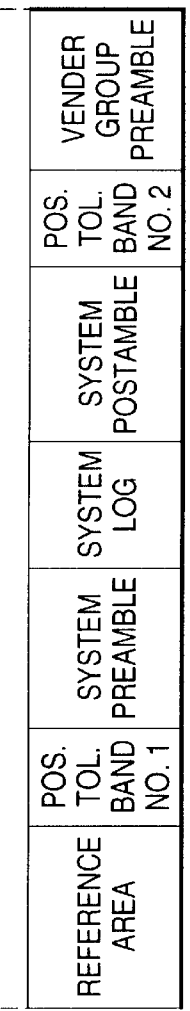
FIG. 6B
FIG. 6C

ID STRUCTURE

PHYSICAL BLOCK ADDRESS NUMBER ON A TRACK

| 0 | 1 | 2 | 3 | ............ | 382 | 383 |

FIG. 9

ID AREA INFORMATION

| RAW FORMAT ID | | 16 BITS |
|---|---|---|
| LOGICAL FORMAT ID | | 8 BITS |
| LOGICAL FRAME ID | LAST FRAME ID | 1 BIT |
| | ECC FRAME ID | 1 BIT |
| | LOGICAL FRAME NUMBER | 6 BITS |
| PARTITION ID | | 16 BITS |
| AREA ID | | 4 BITS |
| DATA ID | | 4 BITS |
| N-POSITION | | 4 BITS |
| N-REPEATS | | 4 BITS |
| GROUP COUNT | | 24 BITS |
| FILE-MARK COUNT | | 32 BITS |
| SAVE-SET MARK COUNT | | 32 BITS |
| RECORD COUNT | | 32 BITS |
| ABSOLUTE FRAME COUNT | | 24 BITS |
| RESERVED | | |

FIG. 10

AREA ID DEFINITIONS

| BIT 3210 | DEFINITION |
|---|---|
| 0000 (0) | DEVICE AREA |
| 0001 (1) | REFERENCE AREA |
| 0010 (2) | SYSTEM AREA |
| 0011 (3) | RESERVED |
| 0100 (4) | DATA AREA |
| 0101 (5) | EOD AREA |
| 0110 (6) | RESERVED |
| 0111 (7) | OPTIONAL DEVICE AREA |

FIG. 12

| | | |
|---|---|---|
| MANUFACTURE INFORMATION (FL1) | MANUFACTURE PART CHECKSUM | 1 BYTE |
| | MIC TYPE | 1 BYTE |
| | MIC MANUFACTURE DATE | 4 BYTES |
| | MIC MANUFACTURE LINE NAME | 8 BYTES |
| | MIC MANUFACTURE PLANT NAME | 8 BYTES |
| | MIC MANUFACTURE NAME | 8 BYTES |
| | MIC NAME | 8 BYTES |
| | CASSETTE MANUFACTURE DATE | 4 BYTES |
| | CASSETTE MANUFACTURE LINE NAME | 8 BYTES |
| | CASSETTE MANUFACTURE PLANT NAME | 8 BYTES |
| | CASSETTE MANUFACTURER NAME | 8 BYTES |
| | CASSETTE NAME | 8 BYTES |
| | OEM CUSTOMER NAME | 8 BYTES |
| | RESERVED | 1 BYTE |
| FL12 → | PHYSICAL TAPE CHARACTERISTIC ID | 1 BYTE |
| | MAXIMUM CLOCK FREQUENCY | 2 BYTES |
| | MAXIMUM WRITE CYCLE | 1 BYTE |
| | MIC CAPACITY | 1 BYTE |
| | WRITE PROTECT START ADDRESS | 2 BYTES |
| | WRITE PROTECTED DATA BYTE COUNT | 2 BYTES |
| | RESERVED | 2 BYTES |

FIG. 13

PHYSICAL TAPE CHARACTERISTIC ID (FL12)

| BIT POSITION | VALUE | | DIFINITION |
|---|---|---|---|
| 7, 6 | 0 | 0 | TAPE THICKNESS 7.0 μm |
| | 0 | 1 | TAPE THICKNESS 5.0 μm |
| | 1 | 0 | TAPE THICKNESS 3.0 μm |
| | 1 | 1 | RESERVED |
| 5 ~ 0 | | | TAPE LENGTH DIV 5 |

FIG. 15

| | | |
|---|---|---|
| FL31 { | VOLUME INFORMATION CHECKSUM | 1 BYTE |
| | VOLUME INFORMATION | 100 BYTES |
| | ACCUMULATIVE PARTITION INFORMATION CHECKSUM | 1 BYTE |
| | ACCUMULATIVE PARTITION INFORMATION | 56 BYTES |
| | VOLUME NOTE CHECKSUM | 1 BYTE |
| | VOLUME NOTE | 8 BYTES |
| | CARTRIDGE SERIAL NUMBER | 32 BYTES |
| | MANUFACTURER ID | 1 BYTE |
| | SECONDARY ID | 1 BYTE |
| | CARTRIDGE SERIAL NUMBER PART CHECKSUM | 1 BYTE |
| VOLUME TAG (FL3) | RESERVED | 1 BYTE |
| | SPECIFIC VOLUME TAG 1 | 36 BYTES |
| | SPECIFIC VOLUME TAG 2 | 36 BYTES |
| | SPECIFIC VOLUME TAG 3 | 36 BYTES |
| | SPECIFIC VOLUME TAG 4 | 36 BYTES |
| | SPECIFIC VOLUME TAG 5 | 36 BYTES |
| | SPECIFIC VOLUME TAG 6 | 36 BYTES |
| | SPECIFIC VOLUME TAG 7 | 36 BYTES |
| | SPECIFIC VOLUME TAG 8 | 36 BYTES |
| | SPECIFIC VOLUME TAG 9 | 36 BYTES |
| | SPECIFIC VOLUME TAG 10 | 36 BYTES |
| | SPECIFIC VOLUME TAG 11 | 36 BYTES |
| | SPECIFIC VOLUME TAG 12 | 36 BYTES |
| | SPECIFIC VOLUME TAG 13 | 36 BYTES |

FIG. 16A

VOLUME INFORMATION

| | |
|---|---|
| VOLUME INFORMATION CHECKSUM | 1 BYTE |
| EJECT STATUS | 20 BYTES |
| REEL DIAMETER | 4 BYTES |
| RESERVED | 1 BYTE |
| INITIALIZE COUNT | 3 BYTES |
| VOLUME INFORMATION ON TAPE | 72 BYTES |

VOLUME INFORMATION ON TAPE

| | | |
|---|---|---|
| RESERVED | | 4 BYTES |
| RESERVED | | 2 BYTES |
| RESERVED | b6, b7, b8 | 3 BITS |
| SUPER HIGH SPEED SEARCH ENABLE FLAG | b5 | 1 BIT |
| SYSTEM LOG ALLOCATION FLAGS | b3, b4 | 2 BITS |
| ALWAYS UNLOAD PBOT FLAG | b2 | 1 BIT |
| AIT NATIVE FLAG | b1 | 1 BIT |
| LAST VALID PARTITION NUMBER | | 1 BYTE |
| OPTIONAL DEVICE AREA ALLOCATION MAP | | 32 BYTES |
| RESERVED | | 32 BYTES |

FL311 (72 BYTES)

FIG. 19

PARTITION INFORMATION

| | | | |
|---|---|---|---|
| PREVIOUS GROUPS WRITTEN | | 4 BYTES | |
| TOTAL GROUPS WRITTEN | | 4 BYTES | |
| RESERVED | | 1 BYTE | |
| PREVIOUS GROUPS READ | | 3 BYTES | |
| TOTAL GROUPS READ | | 4 BYTES | |
| RESERVED | | 1 BYTE | |
| TOTAL REWRITTEN FRAMES | | 3 BYTES | |
| RESERVED | | 1 BYTE | |
| TOTAL 3RD ECC COUNT | | 3 BYTES | |
| ACCESS COUNT | | 4 BYTES | |
| UPDATE REPLACE COUNT | | 4 BYTES | |
| PREVIOUS REWRITTEN FRAMES | | 2 BYTES | |
| PREVIOUS 3RD ECC COUNT | | 2 BYTES | 48 BYTES |
| RESERVED | | 1 BYTE | |
| LOAD COUNT | | 3 BYTES | |
| RESERVED | | 1 BYTE | |
| VALID MAXIMUM ABSOLUTE FRAME COUNT | | 3 BYTES | |
| PARTITION ATTRIBUTE FLAGS | BIT 1 PREVENT WRITE | 1 BYTE | |
| | BIT 2 PREVENT READ | | |
| | BIT 3 PREVENT WRITE RETRY | | |
| | BIT 4 PREVENT READ RETRY | | |
| | BIT 5 RESERVED | | |
| | BIT 6 RESERVED | | |
| | BIT 7 RESERVED | | |
| | BIT 8 PARTITION OPEN CLOSE FLAG | | |
| MAXIMUM ABSOLUTE FRAME COUNT | | 3 BYTES | |

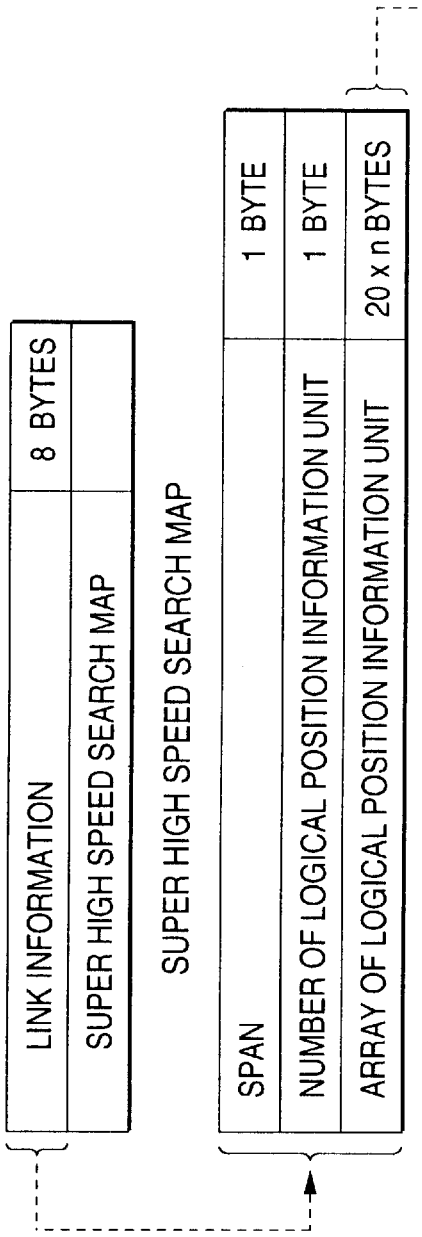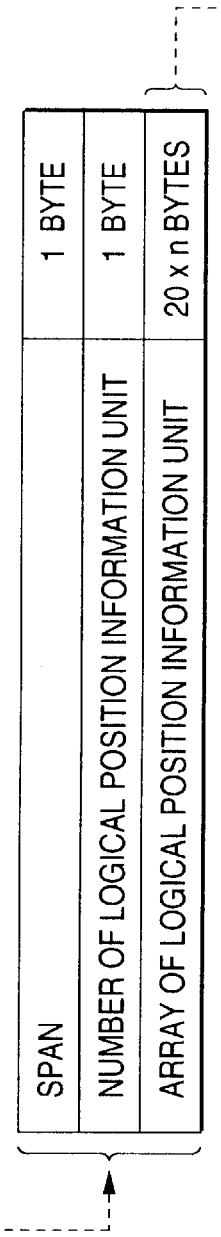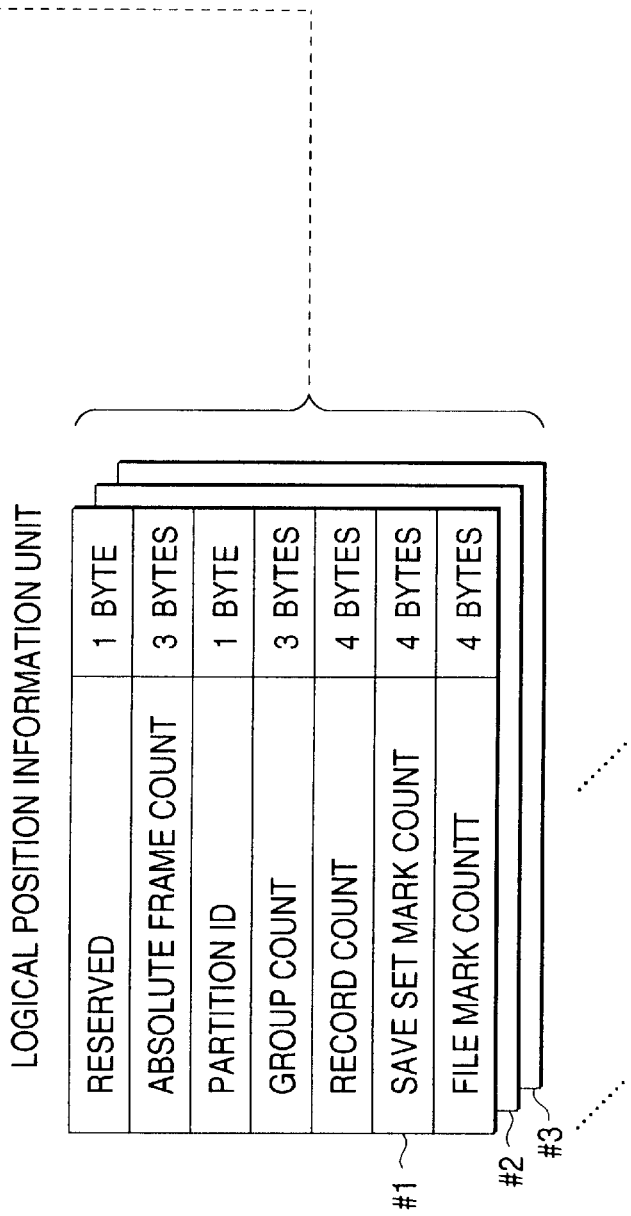
FIG. 20A
FIG. 20B
FIG. 20C

FIG. 23

| POSITION | LPI UNIT | PARTITION ID |
|---|---|---|
| P1 | #1 | 0 |
| P2 | #2 | 0 |
| P3 | #3 | 0 |
| P4 | #4 | 0 |
| P5 | #5 | 0 |
| P6 | #6 | 0 |
| P7 | #7 | 0 |
| P8 | #8 | 0 |
| P9 | #9 | 0 |
| P10 | #10 | 0 |
| P11 | #11 | 0 |
| P12 | #12 | 0 |
| P13 | #13 | 1 |
| P14 | #14 | 1 |
| P15 | #15 | 1 |
| P16 | #16 | 1 |
| P17 | #17 | 1 |

TAPE DRIVING APPARATUS AND RECORDING MEDIUM

BACKGROUND OF THE INVENTION

1. Field of the Invention

The present invention relates to a tape driving apparatus and a recording medium.

2. Description of the Related Art

A so-called tape streaming drive has been known as a driving apparatus which is capable of recording/reproducing digital data to/from a magnetic tape. The tape streaming drive is capable of having an enormous amount of recording capacity of several tens to several hundreds giga bytes for example, though it depends on the length of the tape in a tape cassette, i.e., a medium. Therefore, it is widely used for backing up data recorded in a medium such as a hard disk of a computer main body. It is also considered to be suitable for use in storing image data or the like whose data size is large.

Then, as the tape streaming drive as described above, there has been proposed one which is arranged so as to record/reproduce data by using a tape cassette of an 8 mm VTR as a recording medium and by adopting a helical scan scheme by means of recording and reproducing heads provided at certain positions of a rotary drum for example.

The tape streaming drive utilizing the tape cassette of 8 mm VTR as described above uses SCSI (Small Computer System Interface) for example as an input/output interface of recorded/reproduced data.

Then, in recording data, the data supplied from a host computer is inputted via the SCSI interface and the inputted data is compressed and encoded in a predetermined manner to be recorded in a magnetic tape of the tape cassette.

In reproducing data, the data in the magnetic tape is read, is decoded as necessary and is transmitted to the host computer via the SCSI interface.

By the way, the magnetic tape must be considerably long in order to have such a large capacity. Accordingly, recording/reproduction is carried out on the recording medium of such lengthy magnetic tape upon moving the magnetic tape to desirable position. However, it takes a considerable time depending on the relationship between the current position and the position where it is moved in case of the magnetic tape having such a large capacity because such move of the magnetic tape is carried out while recognizing the current position by reading certain management information recorded in the magnetic tape for example.

Then, it has been demanded to shorten the time in accessing to the desired position by quickly running the magnetic tape without reading the management information from the magnetic tape to move to the certain position.

SUMMARY OF THE INVENTION

In order to solve the above-mentioned problem, according to the invention, a tape driving apparatus comprises tape driving means for running a magnetic tape stored in a tape cassette when the tape cassette is loaded and for recording/ reproducing information to/from the magnetic tape; memory driving means for implementing certain communicating processes to read/write management information from/to a memory when the tape cassette is provided with the memory for recording management information for managing the recording/reproducing operation to/from the magnetic tape; divisional information detecting means for detecting divisional information indicating divisional position unit of logical position information corresponding to positions of the magnetic tape physically and equally divided in the longitudinal direction thereof; target position setting means for setting position on the magnetic tape corresponding to one of the position information as target position; target running amount detecting means for detecting a target running amount based on the position information and divisional information from the current position of the magnetic tape to the target position; actual running amount detecting means for detecting an actual running amount from the point of time when the magnetic tape has started to run; and control means for running the magnetic tape without reading information on the magnetic tape until at least the actual running amount reaches to the target running amount while monitoring the actual running amount from the start of the run.

Further, in a recording medium comprising a tape cassette for storing a magnetic tape; and a memory, provided in the tape cassette, for storing management information for managing a recording/reproducing operation implemented to the magnetic tape, the memory stores logical position information corresponding to position physically and equally divided in the longitudinal direction of the magnetic tape and divisional unit information indicating divisional unit.

According to the invention, the tape driving apparatus is arranged so as to be able to detect the divisional information indicating the divisional position unit of logical position information corresponding to the positions of the magnetic tape physically and equally divided in the longitudinal direction thereof from the memory provided in the tape cassette. Thus, the target running amount from the current position to the target position may be calculated based on the divisional information and the tape running amount in the tape driving apparatus in carrying out High Speed Search by detecting the divisional information without reading information recorded in the magnetic tape.

The inventive recording medium can also supply the divisional information indicating the divisional position unit of the logical position information corresponding to the positions of the magnetic tape physically and equally divided in the longitudinal direction thereof to the tape driving apparatus in which the recording medium concerned is loaded.

The specific nature of the invention, as well as other objects, uses and advantages thereof, will clearly appear from the following description and from the accompanying drawings in which like numerals refer to like parts.

BRIEF DESCRIPTION OF THE DRAWINGS

FIGS. 4A through 4D are explanatory diagrams showing the structure of data on a magnetic tape of the tape cassette of the embodiment;

FIGS. 6A through 6C are explanatory diagrams showing the area structure of the magnetic tape of the tape cassette of the embodiment;

FIG. 9 is a table for explaining ID Area Information of the tape cassette of the embodiment;

FIG. 10 is a table for explaining the definition of Area IDs of the tape cassette of the embodiment;

FIG. 12 is a table for explaining Manufacture Information of the MIC of the embodiment;

FIG. 13 is a table for explaining Memory Management Information of the MIC of the embodiment;

FIG. 15 is a table for explaining Volume Information of the MIC of the embodiment;

FIGS. 16A and 16B are tables for explaining the Eject Status of the MIC of the embodiment;

FIG. 19 is a table for explaining Partition Information of the MIC of the embodiment;

FIGS. 20A through 20C are tables for explaining Super High Speed Search Map Cell of the MIC of the embodiment;

FIG. 23 is a table showing Partition IDs in LPI units; and

DESCRIPTION OF THE PREFERRED EMBODIMENT

An embodiment of the present invention will be explained below.

Although the present applicant has previously proposed various tape cassettes fitted with an nonvolatile memory and tape driving apparatuses (tape streaming drive) which are capable of recording/reproducing digital data in correspondence to the memory-fitted tape cassette, the present invention will be applied to the data storage system comprising the memory-fitted tape cassette and the tape streaming drive in the present specification. It is noted that the nonvolatile memory provided in the tape cassette will be referred to as a MIC (Memory In Cassette) hereinbelow.

The explanation will be given below in the following order:

1. Structure of Tape Cassette;
2. Structure of Tape Streaming Drive;
3. Structure of Data on Magnetic Tape;
4. ID Area:
5. Data Structure of MIC;
6. High Speed Search 1. Structure of Tape Cassette:

At first, the tape cassette fitted with the MIC accommodating to the tape streaming drive 10 of the present embodiment will be explained with reference to FIGS. 1 and 2.

Figure 1:
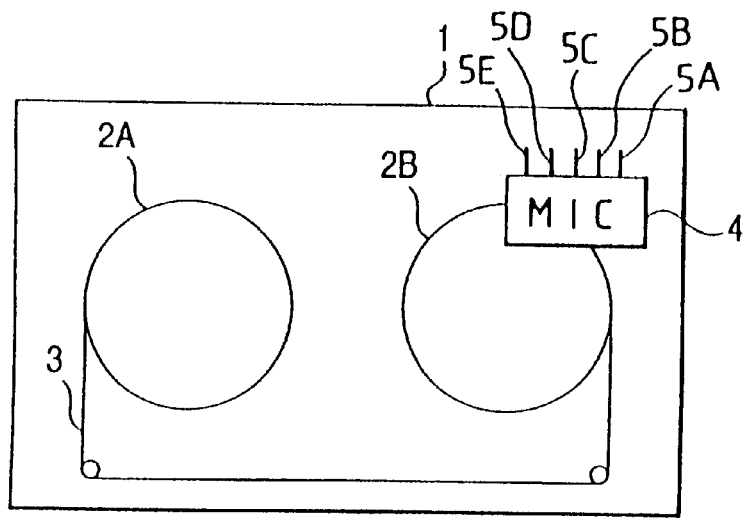
FIG. 1 is an explanatory diagram schematically showing the internal structure of a tape cassette according to one embodiment of the invention.

FIG. 1 conceptually shows the internal structure of the tape cassette 1, wherein a T-reel hub 2A and an S-reel hub 2B are provided and a magnetic tape 3 of 8 mm in tape width is wound between the both reel hubs 2A and 2B. It is noted that when "reel diameter" is referred below, it means a radius of the reel including the magnetic tape 3 which is wound around the reel at that point of time.

The tape cassette 1 is provided with a MIC 4, i.e., the nonvolatile memory. From the module of the MIC 4, five terminals 5A, 5B, 5C, 5D and 5E are led out as a power terminal, a data input terminal, a clock input terminal, an earth terminal and a spare terminal, respectively. Although the detail will be described later, the MIC 4 stores information regarding to the manufacturing date and site of each tape cassette, to thickness, length and material of the tape 3 and to the history of usage of recorded data per each partition formed on the tape 3 and user information. It is noted that the various information stored in the MIC 4 will be referred to also as "management information" in the present specification.

Figure 2:
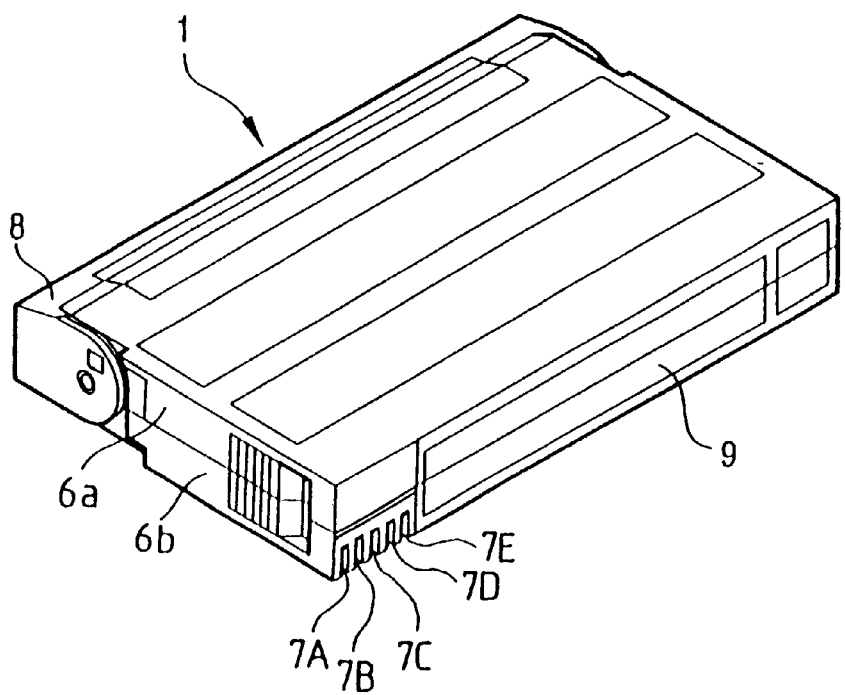
FIG. 2 is a perspective view showing the appearance of the tape cassette of the embodiment.

FIG. 2 shows the appearance of the tape cassette 1. The whole case is composed of an upper case 6a, a lower case 6b and a lid member 8 and is constructed basically in the same manner with a tape cassette used for normal 8 mm VTRs. The tape cassette 1 is provided with terminal pins 7A, 7B, 7C, 7D and 7E on a labeling face 9 on the side of the tape cassette 1 to be connected respectively with the terminals 5A, 5B, 5C, 5D and 5E explained above in connection with FIG. 1. That is, the tape cassette 1 physically contacts with the tape streaming drive 10 that is to be described next via the terminal pins 7A, 7B, 7C, 7D and 7E to mutually transmit data signals and the like.

Figure 3:
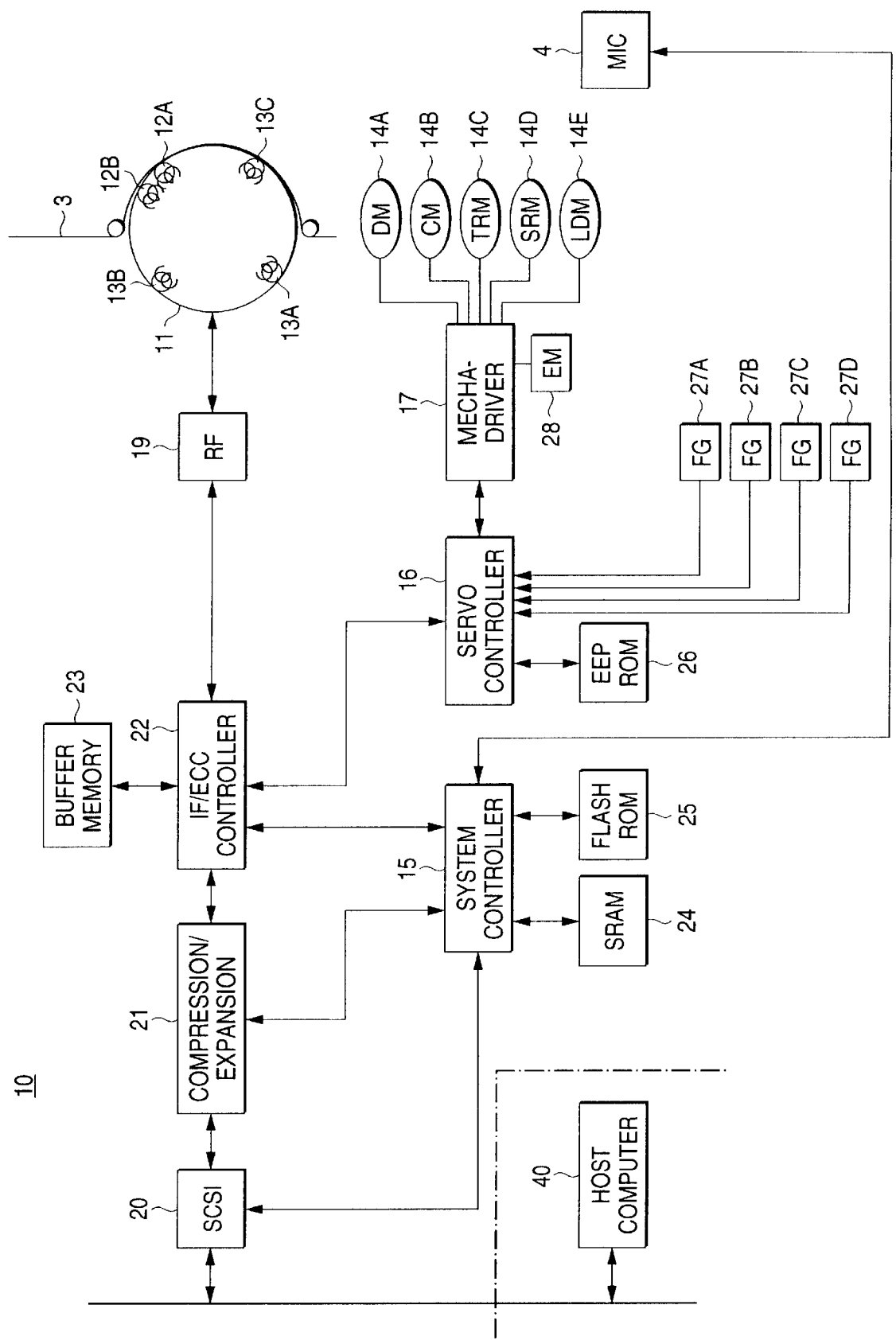
FIG. 3 is a block diagram of a tape streaming drive according to the embodiment of the invention.

2. Structure of Tape Streaming Drive:

Next, the structure of the tape streaming drive 10 of the present embodiment will be explained with reference to FIG. 3. The tape streaming drive 10 records/reproduces data to/from the magnetic tape 3 in the loaded tape cassette 1 in a helical scan scheme.

A rotary drum 11 is provided with two recording heads 12A and 12B and three reproducing heads 13A, 13B and 13C for example.

The recording heads 12A and 12B are disposed so that two gaps having different azimuth angles are very close to each other. The reproducing heads 13A, 13B and 13C also have respective predetermined azimuth angles.

A drum motor 14A rotates the rotary drum 11 around which the magnetic tape 3 pulled out of the tape cassette 1 is wound.

A capstan motor 14B rotates and drives a capstan not shown for running the magnetic tape 3 at constant speed.

A T-reel motor 14C and an S-reel motor 14D rotate the T-reel hub 2A and the S-reel hub 2B within the tape cassette 1 in the normal and inverse directions, respectively.

A loading motor 14E drives a loading mechanism not shown to load/unload the magnetic tape 3 to/from the rotary drum 11.

An ejecting motor 28 is a motor for driving the loading mechanism of the tape cassette 1 and executes operations for seating the inserted tape cassette 1 and for ejecting the tape cassette 1.

A mecha-driver 17 applies power and drives the drum motor 14A, the capstan motor 14B, the reel motors 14C and 14D, the loading motor 14E and the ejecting motor 28. The mecha-driver 17 drives the respective motors based on controls made by a servo controller 16. The servo controller 16 controls the rotating speed of the respective motors to execute various operations such as running of the tape in recording/reproducing data normally, in quickly reproducing data and in quickly feeding and rewinding the tape, the tape cassette loading operation, the loading/unloading operation, the tape tension controlling operation and others.

An EEPROM 26 stores constants and others used by the servo controller 16 for servo-controlling the respective motors.

The drum motor 14A, the capstan motor 14B, the T-reel motor 14C and the S-reel motor 14D are provided with FGs (frequency generator), respectively, to be able to detect information on the rotation of the respective motors in order to enable the servo controller 16 to execute the servo control of the respective motors. That is, a drum FG 27A for generating frequency pulses synchronized with the rotation of the drum motor 14A, a capstan FG 27B for generating frequency pulses synchronized with the rotation of the capstan motor 14B, a T-reel FG 27C for generating frequency pulses synchronized with the rotation of the T-reel motor 14C and an S-reel FG 27D for generating frequency pulses synchronized with the rotation of the S-reel motor 14D are formed and their outputs (FG pulses) are supplied to the servo controller 16.

The capstan FG 27B outputs pulses of 360 waves per turn of the capstan motor 14B for example.

The T-reel FG 27C and the S-reel FG 27D output pulses of 24 waves per turn of the T-reel motor 14C and the S-reel motor 14D, respectively.

Discriminating the rotating speed of the respective motors based on those FG pulses, the servo controller 16 detects an error with intended rotating speed about the rotating operation of each motor and controls the mecha-driver 17 about the applied power corresponding to that error, thus realizing the control of the rotating speed by the closed loop. Accordingly, the servo controller 16 can control the respective motors so that they rotate at target rotating speeds corresponding to the respective operations during the various operations such as the normal run in recording/reproducing data, high-speed search, quick-feed, rewind and others.

The servo controller 16 is bi-directionally connected with a system controller 15 for executing control processes of the whole system via an interface controller/ECC formatter 22 (hereinafter referred to as an IF/ECC controller).

In the tape streaming drive 10, an SCSI interface 20 is used for inputting/outputting data. For instance, data is inputted sequentially from a host computer 40 via the SCSI interface 20 in unit of transmission data of fixed length record and is supplied to a compressing/expanding circuit 21 in recording data. It is noted that there also exists a mode of transmitting data from the host computer 40 in unit of sets of variable length data in such tape streaming drive system.

The compressing/expanding circuit 21 implements a process for compressing the inputted data in a predetermined method as necessary. When a compressing method by means of LZ codes is adopted for example as one example of the compressing methods, dedicated codes are allocated to character strings processed in the past and are stored in a shape of a dictionary. Then, a character string inputted thereafter is compared with the contents of the dictionary and when it coincides with the code in the dictionary, the data of the character string is replaced with the code in the dictionary. When the data of the inputted character string does not coincide with the code in the dictionary, a new code is given thereto and is registered in the dictionary one after another. Thus, the data compression is carried out by registering data of inputted character strings and by replacing the character string data with the codes of the dictionary.

While the output of the compressing/expanding circuit 21 is supplied to the IF/ECC controller 22, the IF/ECC controller 22 stores the output of the compressing/expanding circuit 21 once in a buffer memory 23 by its control operation. The data stored in the buffer memory 23 is processed to be handled finally in unit of fixed length corresponding to 40 tracks of the magnetic tape of Group and is processed into an ECC format under the control of the IF/ECC controller 22.

As the ECC formatting process, an error correcting code is added to the recorded data and the data is modulated so as to fit with the magnetic recording. The data is then supplied to an RF processing section 19.

The RF processing section 19 implements processes such as amplification and record equalizing to the recorded data to generate a recording signal to be supplied to the recording heads 12A and 12B. Thereby, the data is recorded to the magnetic tape 3 from the recording heads 12A and 12B.

The data reproducing operation will be explained briefly. The reproducing heads 13A, 13B and 13C read the data recorded in the magnetic tape 3 as RF reproducing signals and the RF processing section 19 implements reproduction equalizing, generation of reproducing clocks, binarization, decoding (e.g., Viterbi decoding) and others on the reproduced output.

The signal thus read is supplied to the IF/ECC controller 22 to undergo an error correcting process and others at first. It is then stored temporarily in the buffer memory 23 and is read at predetermined point of time to be supplied to the compressing/expanding circuit 21.

Based on the judgment of the system controller 15, the compressing/expanding circuit 21 implements a data expanding process when the data has been compressed by the compressing/expanding circuit 21 during recording, or outputs as it is without implementing the data expanding process when the data is non-compressed data.

The output data of the compressing/expanding circuit 21 is outputted to the host computer 40 as reproduced data via the SCSI interface 20.

The figure also shows the MIC 4 together with the magnetic tape 3 of the tape cassette 1. When the main body of the tape cassette is loaded to the tape streaming drive, the MIC 4 is connected so as to be able to input/output data to/from the system controller 15 via the terminal pins shown in FIG. 4. Thereby, the system controller 15 can read or update the management information recorded in the MIC 4.

Information is transmitted mutually between the MIC 4 and the external host computer 40 by using SCSI commands. Therefore, it is not necessary to provide a dedicated line specifically between the MIC 4 and the host computer 40 and data can be exchanged between the tape cassette 1 and the host computer 40 just by connecting the SCSI interface as a result.

An S-RAM 24 and a flash ROM 25 store data used by the system controller 15 for the various processes.

For instance, the flash ROM 25 stores constants and others used for the control. The S-RAM 24 is used as a work memory, as a memory for storing data read/written from/to the MIC 4, mode data set in unit of tape cassette and various flag data or as a memory used for arithmetic processes.

It is noted that the S-RAM 24 and the flash ROM 25 may be constructed as an internal memory of a microcomputer composing the system controller 15 or part of an area of the buffer memory 23 may be used as a work memory.

While information is transmitted mutually between the tape streaming drive 10 and the host computer 40 by using the SCSI interface 20 as described above, the host computer 40 makes various communications with the system controller 15 by using the SCSI commands.

3. Structure of Data on Magnetic Tape:

Next, a format of data on the magnetic tape 3 in the tape cassette 1 which is recorded/reproduced by the tape streaming drive 10 described above will be explained.

FIGS. 4A through 4D show the structure of data recorded in the magnetic tape 3, wherein FIG. 4A schematically shows one magnetic tape 3. According to the present embodiment, one magnetic tape 3 is divided to be able to use in unit of Partition as shown in FIG. 4A and in case of the present system, to be able to set and manage 256 partitions in maximum. Each partition shown in the figure is managed by Partition No. given as described as Partition #0, #1, #2, #3, . . . .

Accordingly, it is possible to record/reproduce data independently per partition in the present embodiment. For instance, the recording unit of data within one partition shown in FIG. 4B may be divided into a unit of fixed length called Group as shown in FIG. 4C and the data is recorded to the magnetic tape 3 in the unit of this group.

In this case, one group corresponds to a data amount of 20 Frames and one frame is composed of two Tracks as shown in FIG. 4D. The two tracks composing one frame are plus azimuth and minus azimuth tracks adjacent to each other. Accordingly, one group is composed of 40 tracks.

Figure 5A:
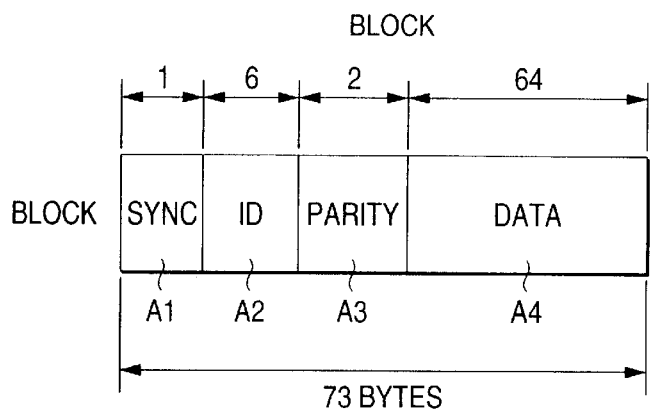
FIGS. 5A through 5C are explanatory diagrams showing the structure of a track on the magnetic tape of the tape cassette of the embodiment.
Figure 5B:
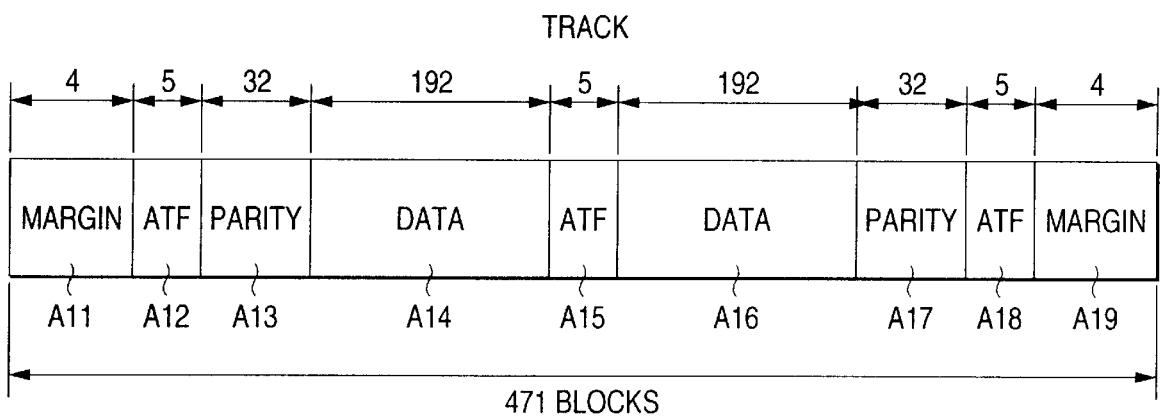

FIGS. 5A and 5B show the structure of data of one track shown in FIG. 4D. FIG. 5A shows the data structure in unit of Block. One block is composed of ID Area A2 of 6 bytes used for Search and the like following to SYNC Data Area A1 of 1 byte, Error Correcting Parity Area A3 composed of 2 bytes for ID data and Data Area A4 of 64 bytes.

Then, data of one track shown in FIG. 5B is composed of 471 blocks in total. One track is provided with Margin Areas A11 and A19 of four blocks at the both ends as shown in the figure and with tracking controlling ATF Areas A12 and A18 after the Margin Area A11 and before the Margin Area A19. Further, it is provided with Parity Areas A13 and A17 after the AFT Area A12 and before the ATF Area A18. An area of 32 blocks are provided for these Parity Areas A13 and A17.

It is also provided with an ATF Area 15 at the middle of one track and an area of five blocks is provided for the ATF Areas A12, A15 and A18. Then, Data Areas A14 and A16 of 192 blocks each are provided between the Parity Area A13 and the ATF area A15 and between the ATF Area A15 and the Parity Area A17, respectively. Accordingly, the whole Data Area (A14 and A16) within one track occupies 192× 2=384 blocks in 471 blocks in total.

Figure 5C:
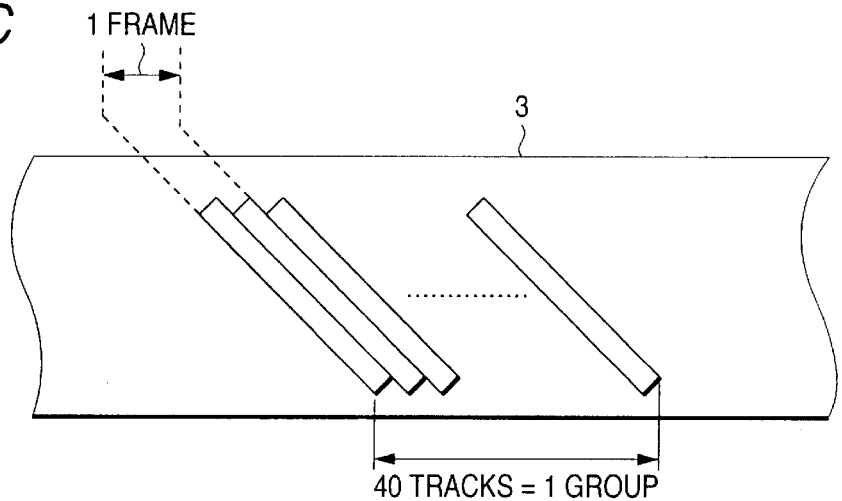

Then, the track is recorded physically on the magnetic tape 3 as shown in FIG. 5C and 40 tracks (=20 frames) compose one group as described before.

The data is recorded on the magnetic tape 3 explained in FIGS. 4 and 5 with the area structure shown in FIGS. 6A through 6C.

It is noted that a case in which N partitions from #0 to #N−1 are formed will be exemplified here.

Leader Tape is positioned physically at the head portion of the magnetic tape 3 as shown in FIG. 6A and Device Area which is an area for loading/unloading the tape cassette is provided next. The head of this Device Area is PBOT (Physical Beginning of Tape).

Following to the Device Area described above, there are provided Reference Area with regard to Partition #0 and System Area (this area including the reference area will be called as System Area hereinbelow) in which information on the history of use of the tape for example is stored. Data Area is provided following to that. The head of the System Area is LBOT (Logical Beginning of Tape).

Formed in this System Area are Reference Area, Position Tolerance Band NO. 1, System Preamble, System Log, System Postamble, Position Tolerance Band NO. 2 and Vendor Group Preamble as shown enlarged in FIG. 6C.

In the Data Area following to such System Area, Vendor Group in which information on a vendor who creates and supplies the data at first is shown is provided and the groups shown in FIG. 4C, i.e., a plurality of Groups shown as Group 1, . . . Group (n) here, are formed continuously as shown enlarged in FIG. 6B. Then, Amble Frame is disposed behind the final Group (n).

Following to such Data Area, an area of EOD (End of Data) indicating the end of the data area of the partition is provided as shown in FIG. 6A.

When only one partition is created, the end of the EOD of that Partition #0 is LEOT (Logical End of Tape). However, because the N partitions are created in this case, Optional Device Area is created following to the EOD of Partition #0.

While Device Area from the head position PBOT is the area for loading/unloading in correspondence to Partition #0, the Optional Device Area at the end of Partition #0 is an area for loading/unloading in correspondence to Partition #1. In the present embodiment, as described later, the Device Area or Optional Device Area as an ejecting management Area is optionally selected based on ejecting position information. That is, unloading at desired position is possible.

For Partition #1, areas are formed in the same manner with Partition #0 and Optional Device Area which is an area for loading/unloading in correspondence to the next Partition #2 is formed at the end thereof.

Thereafter, partitions up to Partition #(N−1) are formed in the same manner.

It is noted that in the last Partition #(N−1), no Optional Device Area is formed because it is not necessary and the end of EOD of Partition #(N−1) is LEOT (Logical End of Tape).

PEOT (Physical End of Tape) indicates the physical end of the tape or the physical end of the Partition.

4. ID Area:

Next, the ID area A2 shown in FIG. 5A will be explained with reference to FIGS. 7 through 10.

Figures 7, 8:
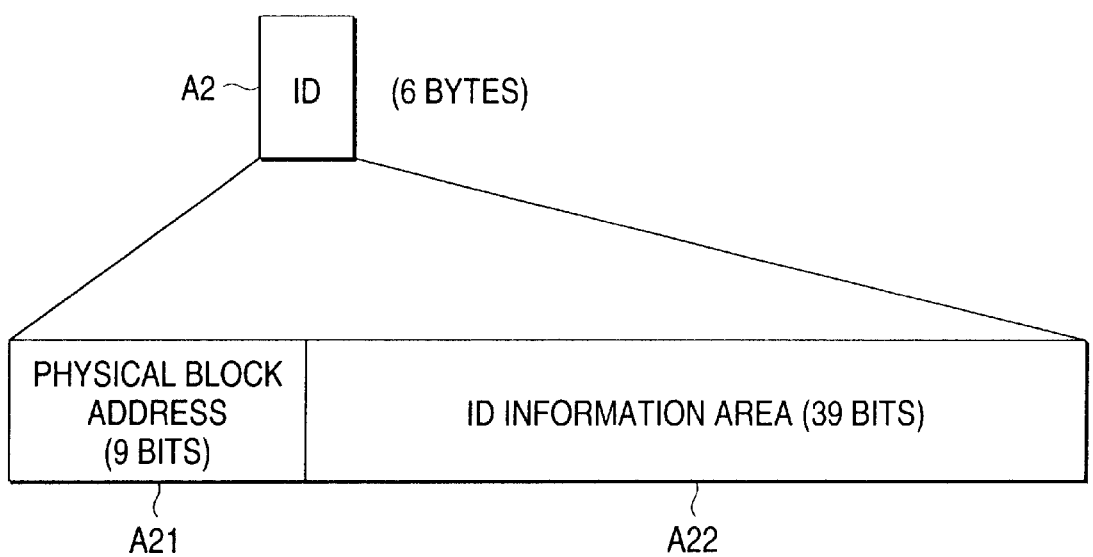
FIG. 7 is an explanatory diagram of an ID area on the magnetic tape in the tape cassette of the embodiment.
FIG. 8 is an explanatory diagram of Physical Block Address in the ID area of the tape cassette of the embodiment.

FIG. 7 shows the data structure of the ID Area A2. The ID Area A2 is composed of two areas of Physical Block Address A21 of 9 bits and ID Information Area A22 of 39 bits.

Because the total data areas (A14 and A16) within one track is composed of 384 blocks as described before, a number of Physical Block Addresses A21 included in these total data areas is also 384.

Then, address values are given to these 384 Physical Block Addresses A21 such that they increment from 0 to 383 in decimal notation in order from the Physical Block Address A21 located at the head of one track as diagrammatically shown in FIG. 8 for example.

Thereby, the recording/reproducing apparatus can adequately handle the information in the ID Information Area A22 contained in the data area within one track. Here, the data size of the ID Information Area A22 contained in the data area within one track is 1,872 bytes as it may be obtained as follows:

39 (Bits)×384 (Blocks)=14,976 (Bits)=1,872 (Bytes)

FIG. 9 shows the types of ID Area information stored in the ID Information Area A22 shown in FIG. 7. Each ID Area information shown in the figure is stored as it is allocated in accordance to a predetermined rule to the ID Information Areas A22, . . . of 1,872 bytes in total contained in the data area of one track. The same type of ID Area information is recorded by a plurality of times in accordance to the predetermined rule per one track so that the tape streaming drive 10 can read the ID Area information reliably.

In FIG. 9, Raw Format ID (16 bits) indicates the type of fundamental format concerning to the magnetic tape. In case of the present embodiment, information on a track pitch, the data size of one frame, a number of blocks contained in one track, the data size of one block, length, thickness and a material of the tape are shown. Logical Format ID (8 bits) indicates the type of a recording format actually used.

Logical Frame ID (8 bits) is composed of Last Frame ID (1 bit), ECC Frame ID (1 bit) and Logical Frame Number (6 bits) as shown in the figure. The Last Frame ID indicates whether or not the present frame containing the ID Area concerned is the last frame within the group and ECC Frame ID indicates whether or not recorded data in the data area of the present frame is ECC (Error Correcting Code).

While one group is composed of 20 frames as described before, Logical Frame Number indicates what number the frame is within the present group.

Partition ID (16 bits) indicates Partition Number of the partition containing the present frame.

Area ID (4 bits) indicates to which area the frame concerned belongs. Data ID (4 bits) indicates a type of data processing mode based on the recording format. N-Position (4 bits) and N-Repeat (4 bits) define information concerning to data accommodating to a multiplex recording mode.

Group Count (24 bits) indicates a total number of groups up to the group in which the frame concerned is contained in the present partition. File Mark Count (32 bits) indicates a total number of file marks contained from the start position to the present group in the present partition. File Mark is the information indicating a delimiter of a data file within one partition.

Save-Set Mark Count (32 bits) indicates a total number of file marks contained from the start position to the present group in the present partition. Save-Set Mark is the information indicating a delimiter of data save position within one partition.

Record Count (32 bits) indicates a total number of records contained from the start position to the present group within the present partition. Absolute Frame Count (24 bits) indicates a total number of frames contained from the start position to the present group within the present partition. Reserved area is also provided to be ready for the case when ID area information is added in the future.

It is noted that the definition of the ID Area information and bit numbers given to the respective ID Area information shown in the figure are just one example and may be changed corresponding to the actual use conditions.

Area ID will be explained here among the various ID Area information shown in FIG. 9.

FIG. 10 shows the contents of definitions of Area ID. In this case, bit numbers (3-2-1-0) are assigned to four bits forming the Area IDs, respectively. When each value of the bit numbers (3-2-1-0) is [0000] as shown in the figure, it is defined to be Device Area, [0001] to be Reference Area, [0010] to be System Area and [0011] to be Reserved.

Further, [0100] is defined to be Data Area, [0101] to be EOD Area, [0110] to be Reserved and [0111] to be Optional Device Area for loading/unloading the magnetic tape 3 beside the essential Device Area shown in FIG. 6.

It is noted that the numbers indicated within ( ) in each column indicating the value of bit of the bit numbers (3-2-1-0) in the figure indicates the respective bit value in the decimal notation.

The tape streaming drive 10 can discriminate the running area, the detailed position within the area, the partition No. and others while reproducing or searching the magnetic tape 3 by recording the ID information as shown in FIGS. 9 and 10 in each block on the magnetic tape.

5. Data Structure of MIC:

Next, the data structure of the MIC 4 provided in the tape cassette 1 will be explained.

Figure 11:
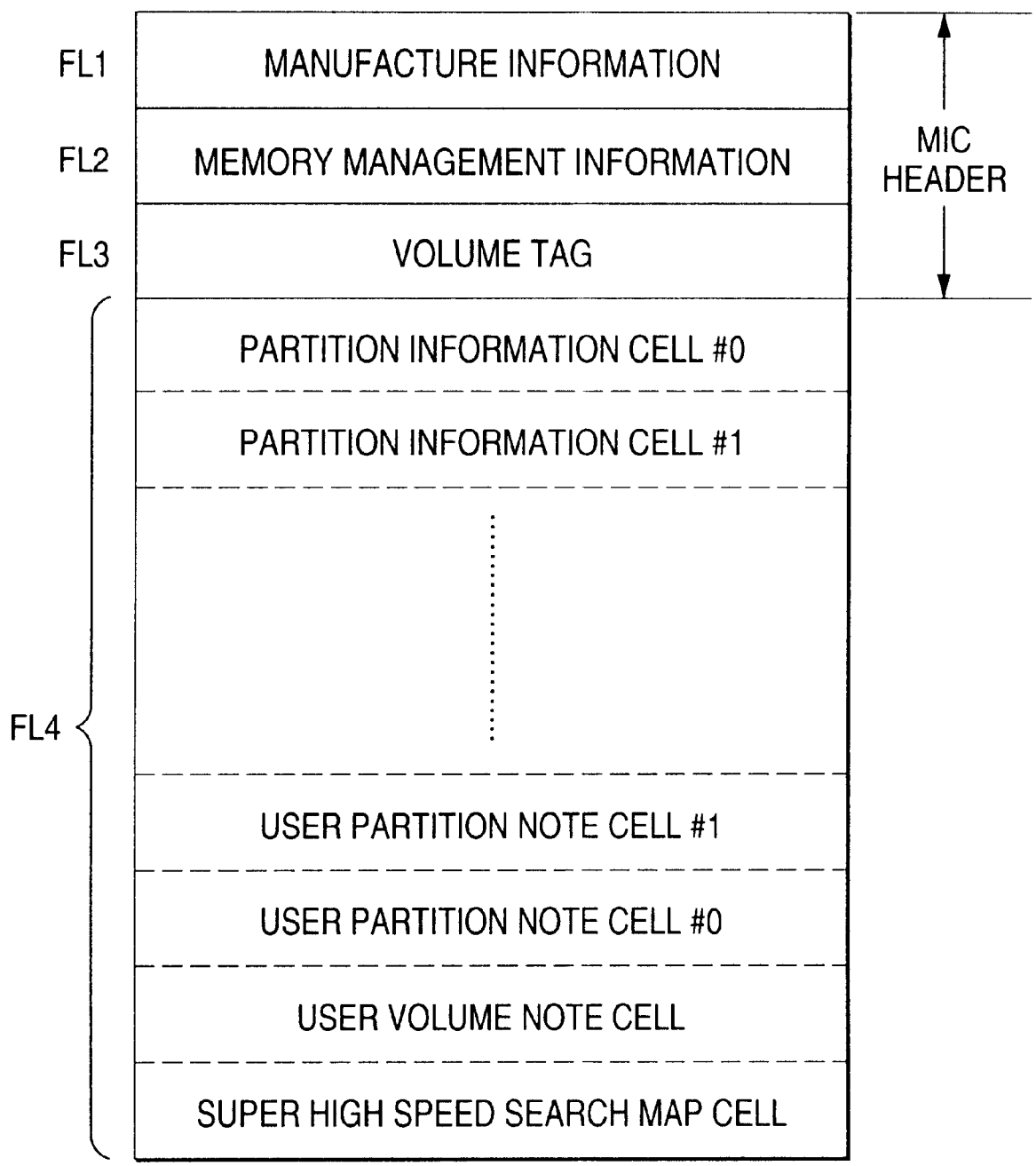
FIG. 11 is a table for explaining the data structure of a memory in cassette (MIC) of the embodiment.

FIG. 11 is a schematic diagram showing one example of the structure of data stored in the MIC 4. Fields FL1 through FL4 are set as shown in the figure as storage areas of the MIC 4.

Various information in manufacturing the tape cassette, tape information at the time of initialization and information per partition are written to these fields FL1 through FL4.

Manufacture information is stored in Field FL1. That is, it is a manufacture part in which various information in manufacturing the tape cassette is mainly stored.

Memory Management Information is stored in Field FL2. That is, it is Drive Initialize Part in which information at the time of initialization is mainly stored.

Volume Tag is stored in Field FL3. That is, fundamental management information of the whole tape cassette is stored therein.

Field FL4 is a memory free pool area in which management information may be stored additionally. The history of recording/reproducing operations and various information are stored as necessary in this memory free pool. It is noted that one unit of data group stored in the memory free pool will be called as "cell" hereinafter.

At first, Partition Information Cells #0, #1, . . . which are management information corresponding to each partition are written one after another from the head of the memory free pool corresponding to Partitions formed on the magnetic tape 3. That is, Partition Information Cells are formed as the same number of cells with the Partitions formed on the magnetic tape 3.

Super High Speed Search Map Cell as map information for high-speed search is written from the rear end side of the memory free pool.

Following to that, User Volume Note Cell and User Partition Note Cell are written from the rear end side. The User Volume Note Cell is the information such as a comment inputted by the user concerning to the whole tape cassette and User Partition Note Cell is the information such as a comment inputted by the user concerning to each partition. Accordingly, these are stored when the user instructs to do so and all of these are not necessarily described.

Intermediate areas in which no such information is stored are left as they are as the memory free pool to be written later.

Manufacture Information in Field FL 1 has the structure as shown in FIG. 12 for example. It is noted that the size (number of bytes) of each data is indicated on the right side.

In the manufacture information, checksum information on the data of the manufacture information is stored as manufacture part checksum at the first 1 byte. The information of this manufacture part checksum is given in manufacturing the cassette.

Then, information from MIC type (mic type) to Write Protect Data Byte Count is described as actual data composing the manufacture part. It is noted that Reserved indicates an area reserved for storing data in the future. The same applies to the explanation hereinbelow.

MIC type is the data indicating the type of MIC actually provided in the tape cassette concerned.

MIC manufacture date indicates the date (and time) when the MIC concerned was manufactured.

MIC manufacture line name indicates the information on the name of a line on which the MIC was manufactured.

MIC manufacture plant name indicates the information on the name of a factory in which the MIC was manufactured.

MIC manufacturer name indicates the information on the name of a manufacturer of the MIC.

MIC name indicates the information on the vendor of the MIC.

The cassette manufacture date, cassette manufacture line name, cassette manufacture plant name, cassette manufacturer name and cassette name describe the information on the cassette itself similarly to the information on the MIC described above.

Information on the name of a customer company of OEM is stored in OEM (Original Equipment Manufacture) customer name. Physical tape characteristic ID FL12 is composed as shown in FIG. 13 for example.

The values of bits 7 and 6 of one bytes of bits 7 through 0 indicate the thickness of the tape. For instance, when the values of the bits 7 and 6 are [00], the thickness is 7 $\mu$m, when [01], the thickness is 5.0 $\mu$m and when [10], 3.0 $\mu$m.

Bits 5 through 0 indicate the length of the tape, e.g., 15 m, 70 m, 120 m, 150 m and 230 m.

Information indicating the maximum clock frequency accommodated by the MIC is stored in maximum clock frequency shown in FIG. 12.

Maximum write cycle represents information on for example how many bytes of data may be transferred by one time of communication with the tape streaming drive 10 as the characteristic of the MIC. This information depends on the physical characteristics of a nonvolatile memory used as the MIC.

MIC capacity represents information on a storage capacity of the MIC concerned.

Write protect start address is used to prohibit to write into a certain area of the MIC and indicates the starting address of a write protected area.

Write protect byte count indicates a number of bytes of the write protected area. That is, an area starting from the address specified by the write protect start address and occupied by the number of bytes indicated by the area of the write protect count is set as the write protected area.

Figure 14:
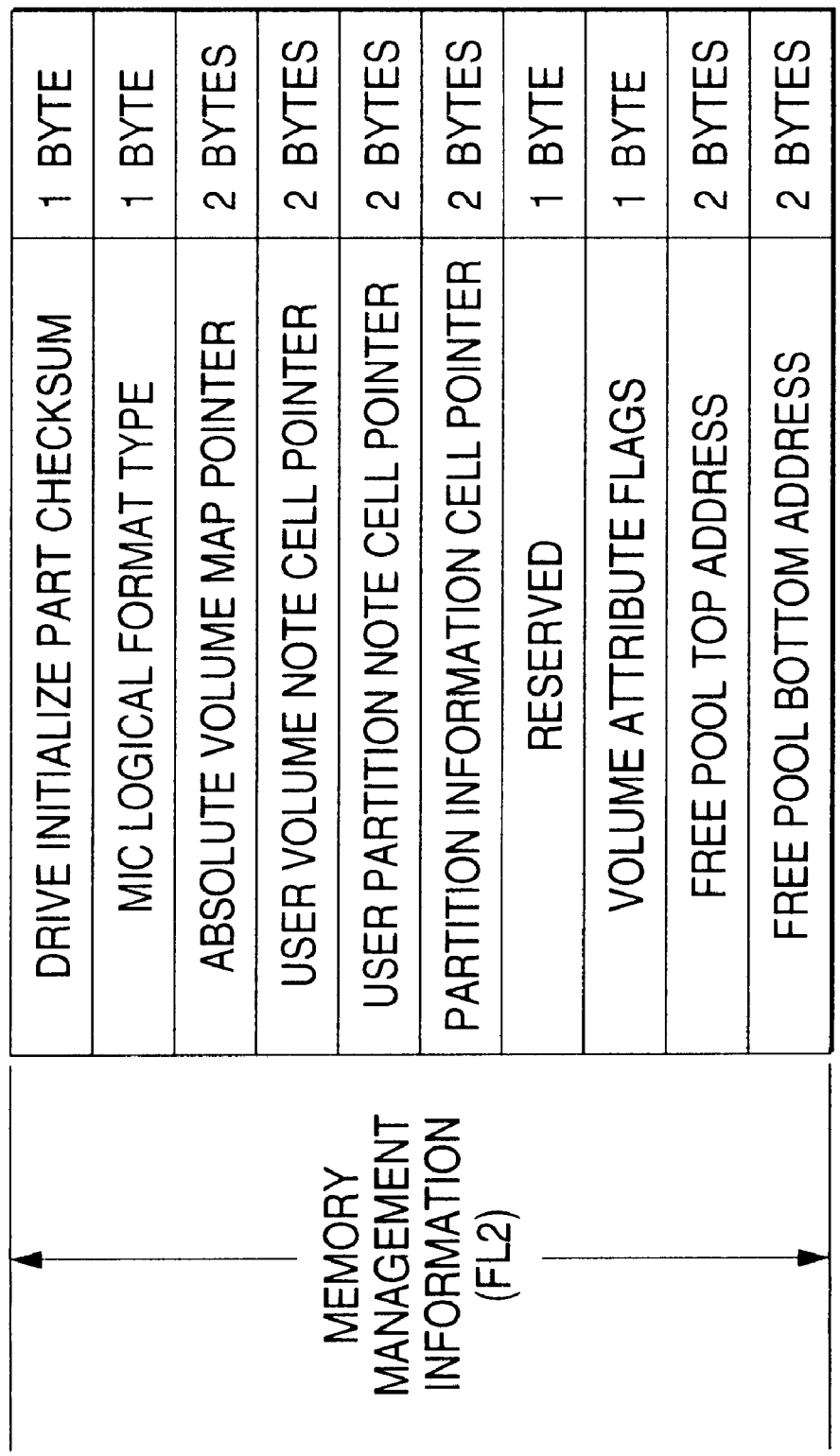
FIG. 14 is a table for explaining Volume Tags of the MIC of the embodiment.

Following to that, the structure of memory management information of Field FL 2 in FIG. 11 will be explained with reference to FIG. 14. The size (number of bytes) of each data is indicated on the right side of the figure.

Information on checksum for data of the memory management information which is the drive initialize part is stored in the memory management information as Drive Initialize Part Checksum at first.

Then, information from MIC Logical Format Type to Free Pool Bottom Address is described as actual data composing the memory management information.

At first, an ID number of a logical format of the MIC is stored as MIC Logical Format Type. Beside the fundamental MIC format, there exist various MIC formats related to a firmware update tape MIC format, a reference tape MIC format and a cleaning cassette MIC format and others, for example. Then, ID number corresponding to the MIC format of the tape cassette concerned is indicated therein.

A pointer indicating the head address of the area of Super High Speed Search Map Cell in FIG. 11 is disposed in Absolute Volume Map Pointer.

User Volume Note Cell Pointer indicates a storage area from/to which the user can read/write freely from/to the tape cassette via the SCSI, i.e., the starting address of User Volume Note Cell shown in FIG. 11.

User Partition Note Cell Pointer indicates a storage area where the user can read/write freely from/to each partition via the SCSI, i.e., the starting address of User Partition Note Cell in FIG. 11. It is noted that while there is a case when a plurality of User Partition Note Cells are stored, the User Partition Note Cell Point indicates the starting address of the head cell among the plurality of User Partition Note Cells.

Partition Information Cell Pointer indicates the starting address of Partition Information Cell #0 in FIG. 11.

While partition information written to the memory free pool is formed only by a number of Partitions formed on the magnetic tape 3, all Partition Information Cells #0 through #N are linked by the pointers by the link structure. That is, the Partition Information Cell pointer is a route indicating the address of Partition #0 and the pointer of Partition Information Cell thereafter is disposed within the previous Partition Information Cell.

The position of each data within Field FL 4 is managed by the respective pointers (Absolute Volume Map Pointer, User Volume Note Cell Pointer, User Partition Note Cell Pointer and Partition Information Cell Pointer) as described above.

Volume Attribute Flags are one byte flags for providing logical write inhibit tab to the MIC 4. That is, the contents of the MIC header flag indicates write enable/inhibit of the manufacture part portion or write enable/inhibit of a portion other than the manufacture part.

Free Pool Top Address and Free Pool Bottom Address indicate the starting and ending addresses of the memory free pool in Field FL 2 at that point of time. Because the area as the memory free pool changes corresponding to data written or erased such as Partition Information and User Partition Note, Free Pool Top Address and Free Pool Bottom Address are updated corresponding to that.

Next, the structure of Volume Tag in Field FL 3 in FIG. 11 will be explained with reference to FIG. 15. The size (number of bytes) of each data is shown on the right side of the figure.

Information on checksum for data in Volume Information in which fundamental management information of the whole tape cassette is stored is stored at the head of the Volume Tag as Volume Information Checksum.

Further, information on checksum for data in Accumulative Partition Information in which history information since when the tape cassette has been manufactured is stored is stored as Accumulative Partition Information Checksum.

Serial numbers of character information of 32 characters based on ASCII code for example are stored in Cartridge Serial Number following to Volume Note Checksum and Volume Note.

A code number of the manufacturer of the tape cassette 1 is stored in Manufacturer ID as a manufacturer identifier.

Secondary ID is a secondary identifier corresponding to the type of the tape cassette 1 wherein attribute information of the tape is stored as a code value of 1 byte for example.

Cartridge Serial Number Part Checksum is checksum information of the Cartridge Serial Number, Manufacturer ID and Secondary ID described above.

Each area of Specific Volume Tags 1 through 13 is composed of 36 bytes as reserve for example.

FIGS. 16A and 16 B are tables for explaining the structure of Volume Information FL31 of Volume Tag FL3.

As shown in FIG. 16A, information of checksum for data of Volume Information is stored in the first 1 byte of Volume Information as Volume Information Checksum.

Then, as actual data composing Volume Information, Eject Status of 20 bytes, Reel Diameter of 4 bytes, Initialize Count of 3 bytes and Volume Information On Tape of 72 bytes are described.

FIG. 16B shows the contents of Volume Information On Tape FL311.

As shown in the table, Super High Speed Search Enable Flag of 1 bit, System Log Allocation Flags of 2 bits, Always Unload PBOT Flag, AIT Native Flag of 1 bit, Last Valid Partition Number of 1 byte and Optional Device Area Allocation Map of 32 bytes are described in Volume Information On Tape FL311 except of areas as Reserved.

Super High Speed Enable Flag is a flag indicating whether or not to validate the high speed search function with respect to the normal search by utilizing tape position information stored as Super High Speed Search Map of the MIC 4 described later. When this flag is "1" for example, High Speed Search is validated.

System Log Allocation Flag is a flag indicating where the history of use of the tape cassette (system log) is stored and is arranged so as to be able to discriminate whether it is recorded only on the magnetic tape 3, not recorded in the magnetic tape 3 nor the MIC 4, recorded both in the magnetic tape 3 and the MIC 4 or recorded only in the MIC 4.

Always Unload PBOT flag is a flag instructing to unload in Device Area in PBOT even when multi-partitions are formed on the magnetic tape 3 and there is Optical Device Area in the partitions.

AIT Native Flag is a flag showing the mode of the tape cassette 1.

Last Valid Partition Number indicates the number of the last partition formed.

Optional Device Area Map is composed of 256 bits and each bit corresponds to each Partition formed on the magnetic tape 3, respectively. Then, when the value of bit is "1", it indicates that Optional Device Area is formed in the Partition corresponding to that bit.

Next, the cell stored in Field FL 4 shown in FIG. 11 will be explained.

Partition Information Cells, User Partition Note Cells and User Partition Note Cell, Super High Speed Search Map Cell and others are stored in Field FL4 as described before.

FIG. 17 shows the structure of each of these cells.

Figure 17A:
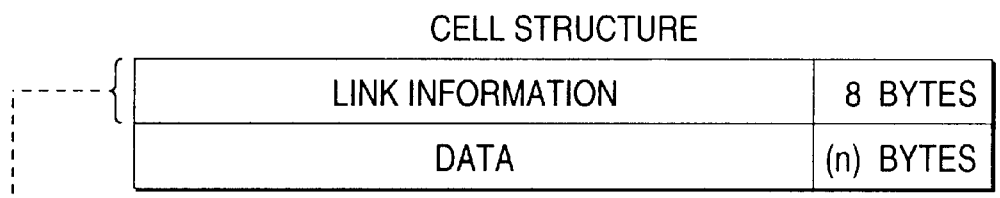
FIGS. 17A and 17B are tables for explaining the structure of Cell of the MIC of the embodiment.

One cell is composed of Link Information of 8 bytes and Data of n bytes (which differs depending on the type of a cell) as shown in FIG. 17A.

Figure 17B:
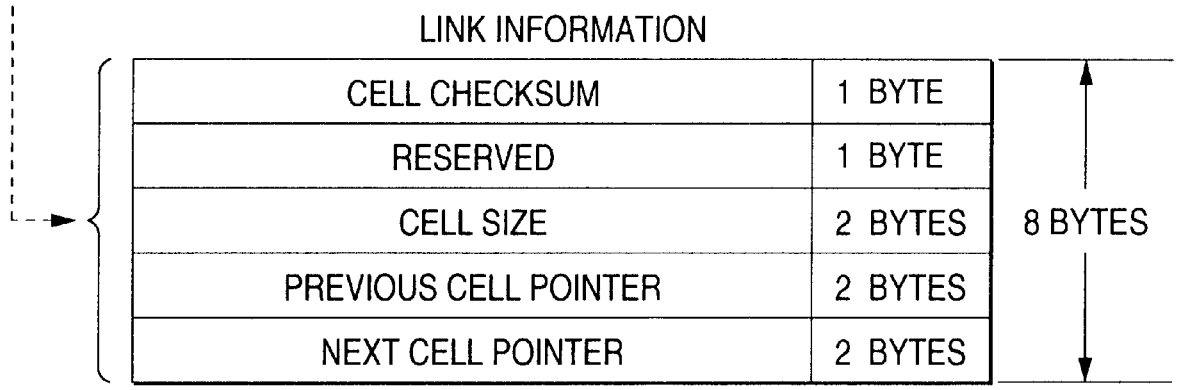

Link Information of 8 bytes is provided in each cell and has the structure as shown in FIG. 17B.

Cell Checksum of 1 byte is provided at first as a checksum concerning to data within the cell.

Further, the size of the cell is represented as Cell Size of 2 bytes. Previous Cell Pointer and Next Cell Pointer are actual linkage data (data configuring the link structure) and the previous and next cells are designated by the previous cell pointer and the next cell pointer in linking a plurality of cells of the same kind.

There exist Partition Information Cell, Super High Speed Search Map Cell, User Volume Note Cell and User Partition Note Cell as cells having such structure. Although the cell size of the Partition Information Cell is fixed, the cell size of the other cells is variable.

Partition Information Cell whose cell size is fixed will be explained with reference to FIGS. 18 and 19.

Figure 18:
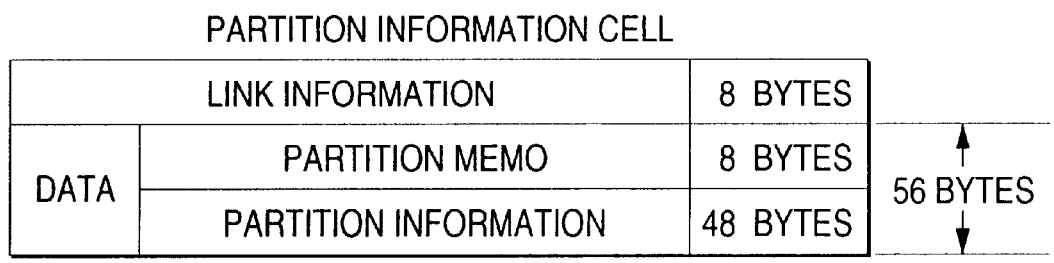
FIG. 18 is a table for explaining Partition Information Cell of the MIC of the embodiment.

Partition Information Cell is formed of Link Information of 8 bytes and data of 56 bytes as shown in FIG. 18. Then, 8 bytes within the data of 56 bytes is allocated for Partition Memo and 48 bytes for Partition Information.

Various information on the history of use of the magnetic tape 3 in Partition to which that cell corresponds is stored in this Partition Information (System Log) to be used by the tape streaming drive as information for managing the recording/reproducing operations.

The data structure of Partition Information within one Partition Information Cell corresponding to a certain Partition is defined as shown in FIG. 19 for example.

Previous Groups written of 4 bytes indicates information on a number of groups within a partition concerned physically recorded on the magnetic tape 3 counting from when the Partition Information has been updated last.

Total Groups Written of 4 bytes indicates a total number of groups recorded in a partition concerned so far. This value is accumulated until when the life of the tape cassette ends and is disabled or discarded.

When data is being recorded in the magnetic tape 3 by the tape streaming drive for example, the value of that area is incremented corresponding to a number of groups recorded newly by the current recording operation to these Previous Groups Written and Total Groups Written by the process of the system controller 15 of the tape streaming drive.

Previous Groups Read of 3 bytes indicates a number of groups physically read counting from when the Partition Information has been updated last.

Total Groups Read of 4 bytes indicates a value to which a number of groups read from the Partition concerned are accumulated.

Total Rewritten Frames of 3 bytes indicates a value obtained by accumulating a number of frames in which rewriting of data is requested based on RAW in the partition concerned.

Total 3rd ECC Count of 3 bytes indicates a value obtained by accumulating a number of groups in which errors are corrected by using the C3 parity in the partition concerned.

While errors of data read out of the magnetic tape 3 is corrected by Parity of C1, C2 and C3 in the tape streaming drive system of the embodiment, the C3 Parity is used when the data cannot be restored only by the C1 and C2 Parity.

Access Count of 4 bytes indicates a number of times of access of the tape streaming drive to the partition concerned on the magnetic tape 3. The access here means a number of times of physically passing the partition concerned and includes a number of times when data is recorded/reproduced to the partition beside the passing number of times.

Update Replace Count of 4 bytes indicates information on an accumulated number of times when data has rewritten to the magnetic tape 3 in the partition concerned by update. That is, it is an updating number of times of the partition concerned.

Previous Rewritten Frames of 2 bytes indicates a number of frames within the partition in which data rewriting is requested counting from the time when Partition Information concerned has been updated last by RAW described before.

Previous 3rd ECC Count of 2 bytes indicates a number of groups in which errors have been corrected by using the C3 Parity counting from the time when Partition Information concerned has been updated last.

Load Count of 3 bytes indicates an accumulated value of a loading number of times of the tape.

Valid Maximum Absolute Frame Number of 3 bytes indicates information on frame count up to the last frame effective in the partition concerned.

With respect to that, Maximum Absolute Frame Number of 3 bytes at the end of Partition Information indicates information on the last frame count of the partition concerned.

Partition Attribute Flag of 1 byte defines the contents of flag for each bit as follows.

That is, flags indicating write enable/inhibit to the partition concerned, read enable/inhibit from the partition concerned, to rewrite enable/inhibit data based on RAW during recording and retry enable/inhibit to read data during reproduction are prepared as Prevent Write Flag, Prevent Read Flag, Prevent Write Pretry Flag and Prevent Read Retry Flag, respectively.

Further, a flag which is set during recording to the partition concerned and is reset in response to the end of the recording is prepared as Partition Open Close Flag.

Super High Speed Search Map Cell formed at the rear end of Field FL4 has the cell structure accompanying Link Information similarly to Partition Information and is data map information necessary for realizing the high speed search function utilizing the performance of the reel motors at maximum without obtaining ID information on realtime from the magnetic tape 3.

Next, Super High Speed Search Map Cell will be explained in accordance to FIGS. 20A through 20C.

Super High Speed Search Map is formed following to Link Information in Super High Speed Search Map Cell as shown in FIG. 20A. FIG. 20B shows the contents of Super High Speed Search Map.

Span is information on division indicating a divided positional unit, e.g., unit of meters, of Logical Position Information Unit which is logical position information corresponding to the positions equally divided on the magnetic tape 3 in the longitudinal direction thereof in order to support the high speed search. When the value of this span is 10 (meters) for example, Logical Position Information Unit indicates position information of 10 meters intervals for example of the magnetic tape 3.

Number Of Logical Position Information Unit indicates a number of Logical Position Information Unit thus formed.

Logical Position Information Units #1, #2, #3, . . . formed of 20 bytes for example are formed by a number described in Number Of Logical Position Information Unit in Array Of Logical Position Information Unit as shown in FIG. 20C.

Figure 21:
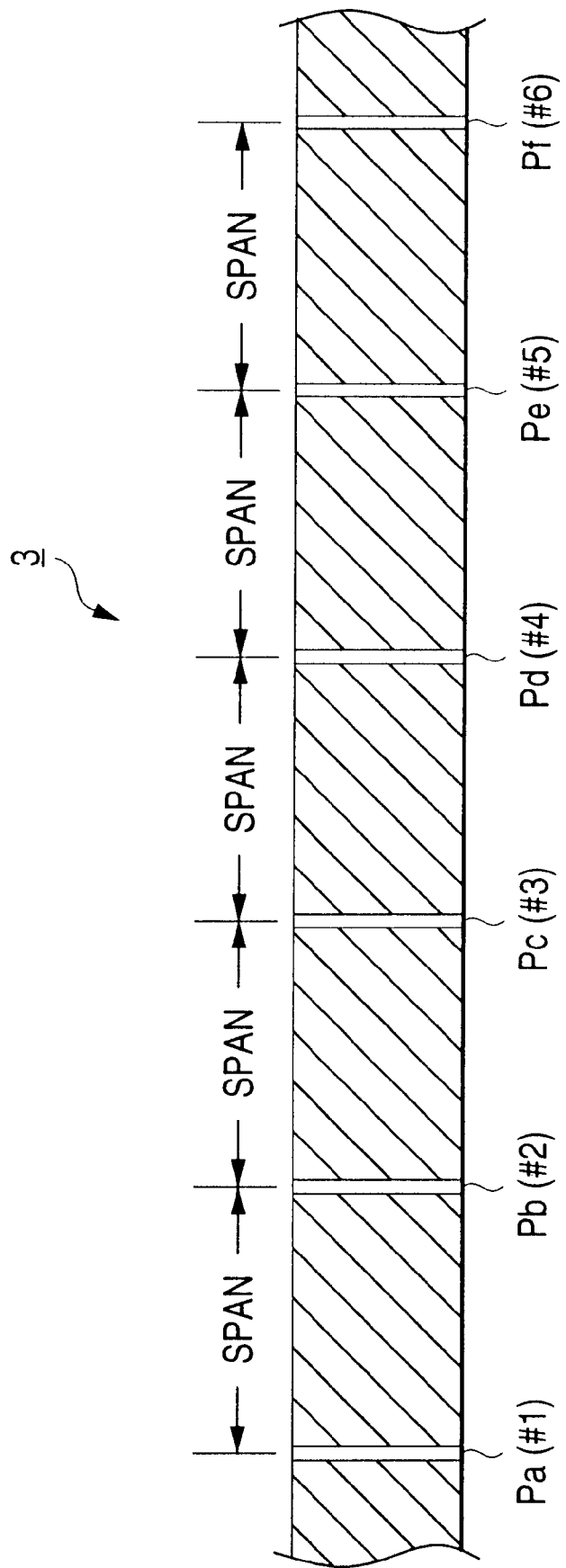
FIG. 21 is a diagram for explaining the relationship between spans and LPI units.

FIG. 21 is a diagrammatic view showing the relationship between Spans and Logical Position Information Unit corresponding to the positions on the magnetic tape 3.

Logical Position Information Units (hereinafter referred to as LPI Unit) #1, #2, #3, . . . are logical position information corresponding to positions P (Pa, Pb, Pc, . . . ) which are at intervals indicated by Spans in an area where data is recorded for example as shown in FIG. 21.

It is noted that although no each data area such as System Area is shown in FIG. 21 for convenience, the information of LPI Unit is actually position information in System Area, Data Area, Device Area and the like in either Partition.

That is, LPI Unit is constructed as shown in FIG. 20C.

Absolute Frame Count indicates a total number of frames contained from the starting position of Partition corresponding to Position P (Pa, Pb, Pc, . . . ) to a group indicated by the position LP concerned.

Partition ID indicates Partition No. of Partition corresponding to position P.

Group Count indicates a total number of groups up to a group contained at the position corresponding the position P concerned in Partition corresponding to the position P.

Record Count indicates a total number of records contained from the starting position of Partition corresponding to the position P to the position corresponding to the position LP.

Save Set Mark Count indicates a total number of file marks contained from the starting position to the group indicated by the position P. Save Set Mark is information indicating a delimiter of data saving position within one partition.

File Mark Count indicates a total number of file marks contained from the starting position to the position corresponding to the position P. File Mark is information indicating a delimiter of data file within one partition.

Thus, the position information such as Absolute Frame Count, Partition ID, Group Count, Record Count, Save Set Mark Count, File Mark Count and the like in the position P (Pa, Pb, Pc, . . . ) corresponding to the intervals of Spans shown in FIG. 21 are stored in LPI Units #1, #2, #3, . . . .

It is noted that the value of Span is set based on the resolution of the T-reel FG 27C and the S-reel FG27D of the tape streaming drive 10 where this tape cassette 1 is used, the recording density to the magnetic tape 3 and the like.

While the data structure of the MIC 4 is constructed as explained above with reference to FIGS. 11 through 20, such data structure of the MIC 4 is merely an example to the end and the disposition of data, setting of the areas, the contents of the data, the data size and the like are not limited to those described above.

6. High-speed Search:

The outline of High Speed Search implemented with the aid of information of Super High Speed Search Map Cell will be explained below.

Normal Search for moving the position of the magnetic tape is carried out while reading ID Area Information for example stored on the magnetic tape 3 as shown in FIG. 9 for example on realtime. In this case, the T-reel motor 14C and the S-reel motor 14D must be driven with the speed which allows at least ID Area Information to be read because Quick Feed and Rewind are carried out while reading the data.

Then, high-speed run of the magnetic tape has been realized to search at high speed by utilizing the performance of the T-reel motor 14C and the S-reel motor 14D efficiently without reading ID Area Information of the magnetic tape 3 based on Super High Speed Search Map Cell shown in FIG. 20. Such Search will be referred to as High Speed Search hereinbelow.

Figure 22:
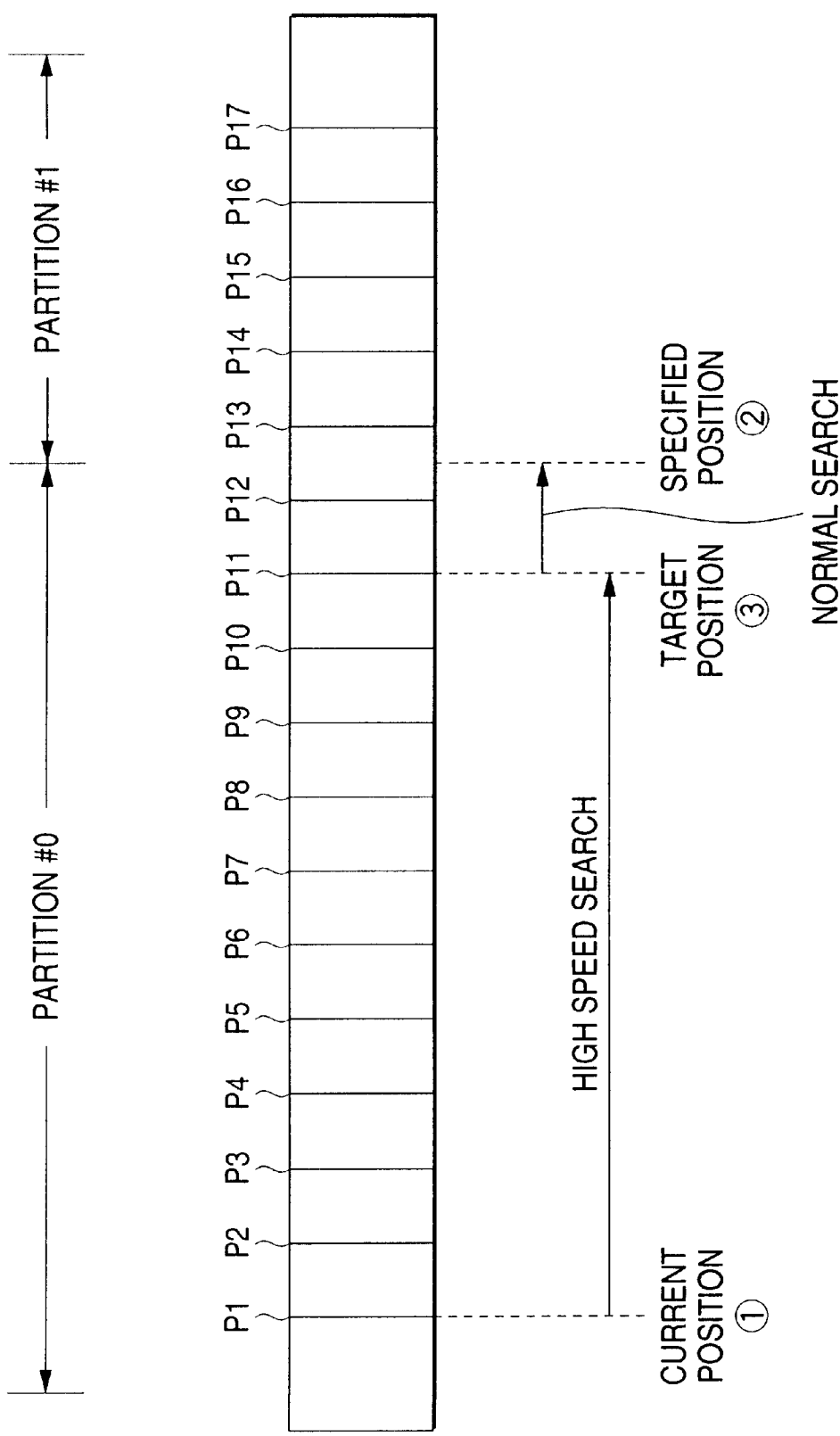
FIG. 22 is a diagram for explaining the outline of High Speed Search.

This High Speed Search is implemented in the process as shown in a diagram of FIG. 22 for example. It is noted that Super High Speed Search Map Cells in the MIC 4 have LPI unit #1, #2, #3, . . . #17 as positional information corresponding to positions P1 through P17 on the magnetic tape 3.

It is supposed in the example shown in the figure that the tape streaming drive 10 receives a search command from the host computer 40 so as to move to a specified position (2) specified by the search command when the current position (1) is set around the head of Partition #0. In this case, the information for specifying the position is a file mark, a partition number or the like. Then, Position P11 having a certain margin with respect to Position P12 which is close to the specified position (2) is set as a temporary target position (3) by retrieving LPI units #1, #2, #3, . . . #17 based on the information for specifying the position.

Then, the magnetic tape 3 is fed based on FG pulses synchronized with the rotation of the T-reel motor 14C and the S-reel motor 14D outputted from the T-reel FG 27C and the S-reel FG 27D without reading the magnetic tape 3 as High Speed Search from the current position (1) to the target position (3).

By the way, the current position (1) may be grasped by the thickness of the tape and the reel diameter. The thickness of the tape may be obtained from Physical Tape Characteristic ID shown in FIG. 13 for example and the reel diameter may be obtained from the ratio of wound diameters of the both reels which is found from the difference of FG pulse numbers detected from the frequency pulses of the T-reel motor 14C and the S-reel motor 14D driving the T-reel hub 2A and the S-reel hub 2B. That is, the magnetic tape 3 may be fed by counting the number of FG pulses outputted from the T-reel FG 27C and the S-reel FG 27D for example from the current position (1) found based on such information till the target position (3) set based on the specified position (2).

The number of FG pulses to be detected from the current position (1) to the target position (3) may be found by calculating-t-he physical distance from the current position (1) to the target position (3) based on the spans and by reducing this distance to the number of FG pulses. That is, this number of FG pulses is the running amount required in moving from the current position (1) to the target position (3).

In the example shown in FIG. 22, Positions P1 through P12 are positions within Partition #0 and Positions P13 through P17 are positions within Partition #1. That is, Partition ID in LPI unit corresponding to each position turns out as shown in FIG. 23 and ten "Os" are detected for example as the values from LPI units #2 through #11. Accordingly, the physical distance between the current position (1) and the target position (3) is found as "Span ×10". When the span is 10 meters for example, the physical distance between the current position (1) and the target position (3) may be found to be around 100 meters.

Further, the number of revolutions of the T-reel hub 2A and the S-reel hub 2B corresponds almost with the running distance of the magnetic tape 3, so that the number of FG pulses detected in connection with the running distance of the magnetic tape 3 also corresponds to that.

That is, in the case of this example, it is found how many FG pulses are detected when the magnetic tape 3 runs 100 meters for example and its value is set as a target count value as the target running amount corresponding to the target position (3). Then, when High Speed Search is started, the FG pulses are also started to be counted. It is then possible to discriminate the arrival to the target position (3) when the count value of the FG pulses reaches the target count value.

Arriving at the target position (3) by carrying out High Speed Search as described above, the magnetic tape 3 is run while reading ID Area Information on realtime by Normal Search and the search is ended at the point of time when information corresponding to the specified position (2), e.g., File Mark or the like, is detected.

It is noted that although the running direction of the magnetic tape in High Speed Search and Normal Search has been in the normal direction in FIG. 22 because the case of moving around to the head of Partition #1 which is the specified position has been exemplified by setting the position around the head of Partition #0 as the current position (1), High Speed Search and Normal Search will be carried out in the reverse direction in moving around to the head of Partition #0 as the specified position by setting the position around the head of Partition #1 as the current position (1) for example.

Further, although the case in which the current position (1) is the position P1 has been exemplified in case of FIG. 22, it is possible to grasp the distance from the current position (1) to the target position (3) approximately even when the current position (1) does not coincide with the position P. That is, because ID Area of the magnetic tape 3 may be read after ending High Speed Search, it is possible to move it to the specified position (2).

Figure 24:
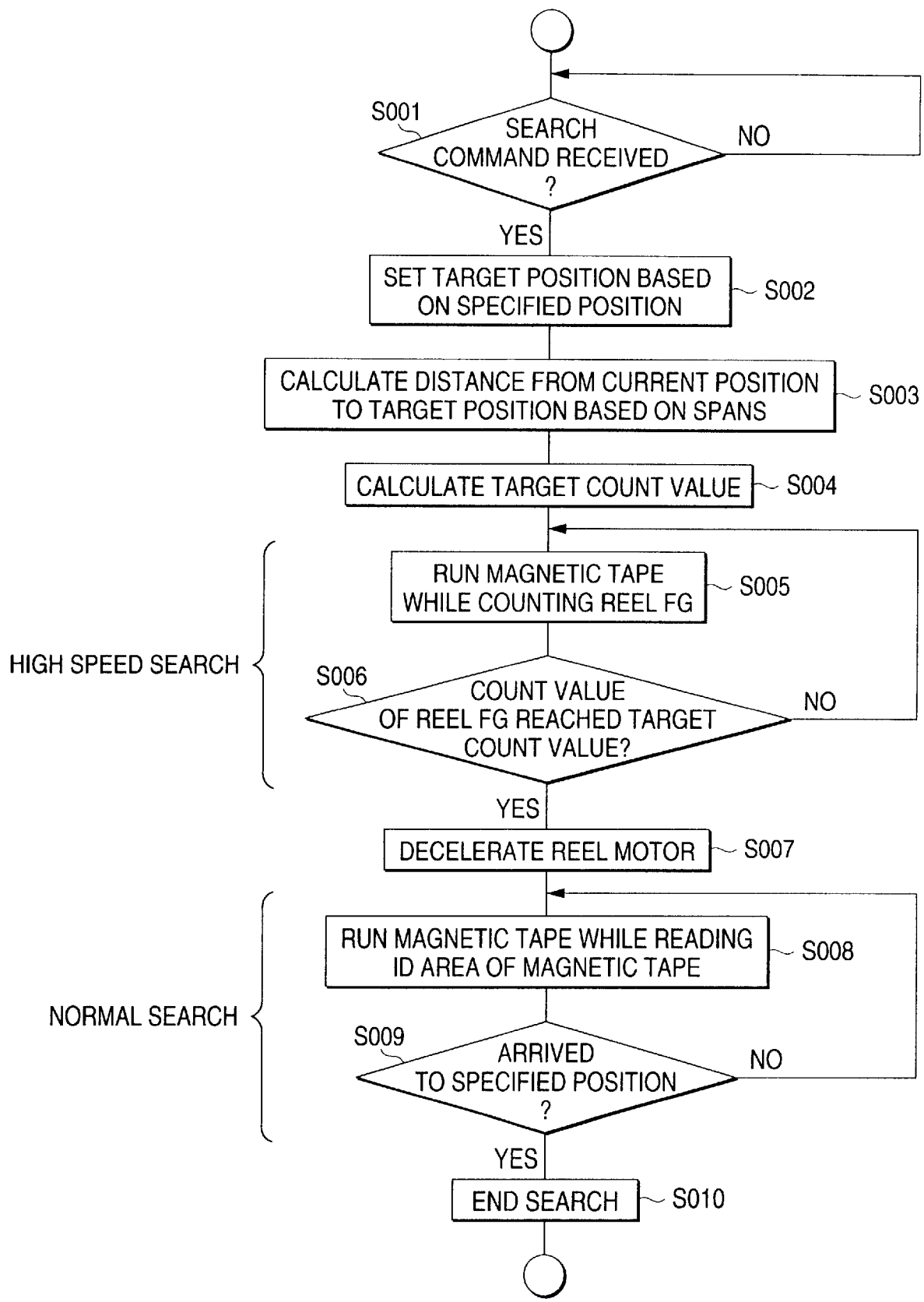
FIG. 24 is a flowchart explaining the transition of processes of a system controller in implementing High Speed Search.

FIG. 24 is a flowchart showing one example of transition of processes of the system controller 15 in moving from the current position (1) to the specified position (2). It is noted that the flowchart in the figure is the transition of processes carried out when High Speed Search is validated by Super High Speed Search Enable Flag shown in FIG. 16.

Receiving a search command from the host computer 40 (S001), the system controller 15 sets the target position (3) based on the specified position (2) specified by this search command (S002). When the specified position (2) is set, the system controller 15 calculates the target running amount from the current position (1) to the target position (3) based on Span (S003) and calculates the target count value as the running amount corresponding to the calculated distance (S004). Then, the system controller 15 controls so as to run the magnetic tape 3 while counting the reel FG (S005) and shifts to High Speed Search.

Starting High Speed Search, the system controller 15 judges whether or not the count value of the reel FG has reached the target count value (S006). When it judges that the count value has not reached the target count value, it considers that the target position (3) has not reached yet and continues High Speed Search.

When, it judges that the count value has reached the target count value, it considers that the target position (3) has been reached, decelerates the speed of rotation of the T-reel motor 14C and the S-reel motor 14D (S007), controls so as to run the magnetic tape 3 while reading ID Area of the magnetic tape 3 (S008) and shifts to the normal mode. After shifting to the normal mode, it judges whether the specified position (2) has been reached or not based on information read out of the magnetic tape 3 (S009) and when it judges that the specified position (2) has not been reached yet, it continues Normal Search.

When it judges that the specified position (2) has been reached, it ends the search on the specified position (2) which has been executed based on the search command from the host computer 40 (S010).

Thus High Speed Search may be carried out by calculating the target count value which is a number of FG pulses from the current position (1) to the target position (3) by grasping the value of Span.

It should be understood that variations to the embodiment described above will occur to those skilled in the art within the scope of the present inventive concepts which are delineated by the following claims.

What is claimed is:

1. A tape driving apparatus, comprising:

tape driving means for running a magnetic tape accommodated in a tape cassette and for recording/reproducing information to/from said magnetic tape;

memory driving means for reading/writing management information from/to a memory provided in said tape cassette for recording management information for managing the recording/reproducing operation of said tape driving means;

divisional information detecting means for detecting logical position information corresponding to a plurality of positions on said magnetic tape physically and equally divided in a longitudinal direction thereof and for detecting divisional information indicating a divisional position unit;

target position setting means for setting a position on said magnetic tape corresponding to one of said plurality of positions corresponding to said logical position information as a target position;

target running amount detecting means for detecting a target running amount based on said logical position information and on said divisional information from a current position of said magnetic tape to said target position;

actual running amount detecting means for detecting an actual running amount from a time when said magnetic tape has started to be run by said tape driving means; and control means for running said magnetic tape without reading logical position information or divisional information from said magnetic tape until at least the actual running amount reaches the target running amount while detecting the actual running amount from the time of starting the run, wherein said management information contains flag information indicating whether a high speed search function is enabled and said control means controls the running of said magnetic tape in response to said flag information.

2. The tape driving apparatus according to claim 1, wherein said target running amount detecting means reduces said target running amount to a number of pulses outputted from a reel frequency generator and said actual running amount detecting means counts the pulses outputted from said reel frequency generator.

3. A recording medium, comprising:

a tape cassette accommodating a magnetic tape; and a memory provided in said tape cassette for storing management information for managing a recording/reproducing operation implemented to said magnetic tape, wherein said memory stores logical position information corresponding to positions physically and equally divided in a longitudinal direction of said magnetic tape and stores divisional unit information indicating a divisional unit, and stores flag information indicating whether a high speed search functions is enabled and said flag is used to control a running of said magnetic tape.

* * * * *